United States Patent
Coscarella

(12) 
(10) Patent No.: US 6,446,665 B2
(45) Date of Patent: Sep. 10, 2002

(54) BACKWATER VALVE

(76) Inventor: Gabe Coscarella, 15703 - 64 Street, Edmonton, Alberta (CA), T5Y 2N5

( * ) Notice: Subject to any disclaimer, the term of this patent is extended or adjusted under 35 U.S.C. 154(b) by 0 days.

(21) Appl. No.: 09/746,791

(22) Filed: Dec. 20, 2000

(30) Foreign Application Priority Data

Mar. 23, 2000 (CA) .............................................. 2302454

(51) Int. Cl.[7] ......................... F16K 31/20; F16K 31/22; F16K 33/00
(52) U.S. Cl. ........................ 137/420; 137/409; 137/448
(58) Field of Search ................................ 137/409, 420, 137/448; 141/198; 4/393, 394, 395, 441, 442, 669, 679, 687, 688; 405/96

(56) References Cited

U.S. PATENT DOCUMENTS

| | | | | |
|---|---|---|---|---|
| 194,676 A | | 8/1877 | Hansen ........................ 137/527 |
| 199,696 A | | 1/1878 | Dikeman ..................... 137/448 |
| 217,431 A | * | 7/1879 | Tilton ......................... 137/420 |
| 271,644 A | * | 2/1883 | Lowrie ........................ 137/420 |
| 289,108 A | | 11/1883 | Johnson ....................... 137/409 |
| 384,396 A | * | 6/1888 | Shepherd ..................... 137/420 |
| 384,397 A | * | 6/1888 | Shepherd ..................... 137/420 |
| 424,580 A | * | 4/1890 | Shepherd ..................... 137/420 |
| 500,453 A | * | 6/1893 | Wright ......................... 137/420 |
| 1,031,567 A | * | 7/1912 | Miller .......................... 137/420 |
| 1,113,648 A | * | 10/1914 | Karlson ....................... 137/420 |
| 1,183,692 A | * | 5/1916 | Strout ......................... 137/420 |
| 1,205,199 A | | 11/1916 | Healy .......................... 137/448 |
| 1,584,666 A | | 5/1926 | Shockley ..................... 137/409 |
| 1,606,396 A | | 11/1926 | Blom .......................... 137/409 |
| 1,861,397 A | | 5/1932 | Khun .......................... 137/448 |
| 1,864,443 A | | 6/1932 | Khun .......................... 137/448 |
| 1,924,498 A | | 8/1933 | House ......................... 137/409 |
| 2,013,188 A | * | 9/1935 | Reinhardt .................... 137/420 |
| 2,266,930 A | * | 12/1941 | Watson ........................ 137/420 |
| 2,290,461 A | * | 7/1942 | Young ......................... 137/448 |
| 2,292,509 A | * | 8/1942 | Carson ........................ 137/448 |
| 2,638,178 A | | 5/1953 | McRill ......................... 137/409 |
| 2,695,072 A | | 11/1954 | Hauslein ...................... 137/448 |

(List continued on next page.)

FOREIGN PATENT DOCUMENTS

CA 2114602 7/1997 ............. E03F/7/04

OTHER PUBLICATIONS

Product information for the ZURN Z–1091 Backwater Valve, Zurn Industries Limited, 1 page, dated at least as early as Dec. 2000.

*Primary Examiner*—George L. Walton
(74) *Attorney, Agent, or Firm*—Davis & Bujold, P.L.L.C.

(57) ABSTRACT

A backwater valve includes a body having a flow passage extending therethrough with an inlet side and an outlet side. A closure gate is pivotally mounted within the body above the inlet side of the flow passage. The closure gate has an open position above the flow passage and a closed position blocking the inlet side of the flow passage. A float activated locking member is mounted on the body. The locking member has a locking position and a release position. In the locking position, the locking member engages and holds the closure gate in the open position. The float activated locking member is influenced by liquid rising in the body whereby the locking member is carried to the release position when the liquid rises above a preset level and upon release the closure gate closes by force of gravity.

3 Claims, 5 Drawing Sheets

U.S. PATENT DOCUMENTS

| | | | |
|---|---|---|---|
| 2,928,410 A | 3/1960 | Del Vecchio | 137/448 |
| 3,176,707 A | 4/1965 | Wilson | 137/448 |
| 3,395,721 A * | 8/1968 | Shibata | 137/420 |
| 3,626,521 A | 12/1971 | Delco | 137/448 |
| 3,781,920 A | 1/1974 | Browne et al. | 4/441 |
| 3,933,444 A | 1/1976 | Kilgore | 48/192 |
| 3,974,654 A | 8/1976 | Mirto, Jr. | 137/409 |
| 4,324,506 A | 4/1982 | Steinke | 405/96 |
| 4,475,571 A * | 10/1984 | Houston, Jr. et al. | 137/430 |
| 4,503,881 A | 3/1985 | Vecchio | 137/425 |
| 4,544,027 A | 10/1985 | Goldberg et al. | 165/95 |
| 4,787,103 A | 11/1988 | Endo | 4/441 |
| 4,844,610 A | 7/1989 | North, Jr. | 356/73 |
| 4,891,994 A | 1/1990 | Barba | 74/2 |
| 5,234,018 A | 8/1993 | Grachal et al. | 137/244 |
| 5,406,972 A | 4/1995 | Coscarella et al. | 137/409 |
| 5,669,405 A | 9/1997 | Engelmann | 137/115.07 |
| 5,819,791 A | 10/1998 | Chronister et al. | 137/512.1 |
| 5,934,313 A | 8/1999 | Brothers et al. | 137/351 |
| 5,947,152 A | 9/1999 | Martin et al. | 137/527.2 |

* cited by examiner

BACKWATER VALVE

FIELD OF THE INVENTION

The present invention relates to a backwater valve for use in liquid flow lines to prevent a reversing of the flow stream.

BACKGROUND OF THE INVENTION

In U.S. Pat. No. 5,406,972 which issued 1995, Gabe Coscarella disclosed a backwater valve with a pivotally mounted closure gate. A float was mounted to the closure gate. The closure gate sat in the liquid stream. As the liquid stream rose the float caused the closure gate to float into a closed position.

The backwater valve described in the Coscarella patent was useful in a variety of applications and has come into widespread commercial usage. There were some applications encountered, however, in which it was not desirable to have the closure gate positioned in the liquid stream.

SUMMARY OF THE INVENTION

What is required is an alternative configuration of backwater valve in which the closure gate does not float in the liquid stream.

According to the present invention there is provided a backwater valve which includes a body having a flow passage extending therethrough with an inlet side and an outlet side. A closure gate is pivotally mounted within the body above the inlet side of the flow passage. The closure gate has an open position above the flow passage and a closed position blocking the inlet side of the flow passage. A float activated locking member is mounted on the body. The locking member has a locking position and a release position. In the locking position, the locking member engages and holds the closure gate in the open position. The float activated locking member is influenced by liquid rising in the body whereby the locking member is carried to the release position when the liquid rises above a preset level and upon release the closure gate closes by force of gravity.

With the backwater valve, as described above, the closure gate is held in the open position out of the liquid stream by the locking member. When liquid starts to fill the valve body, the rising liquid carries the locking member to the release position. The locking member then releases the closure gate which falls by force of gravity to the closed position to prevent a reversal of liquid flow back through the inlet side of the flow passage.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
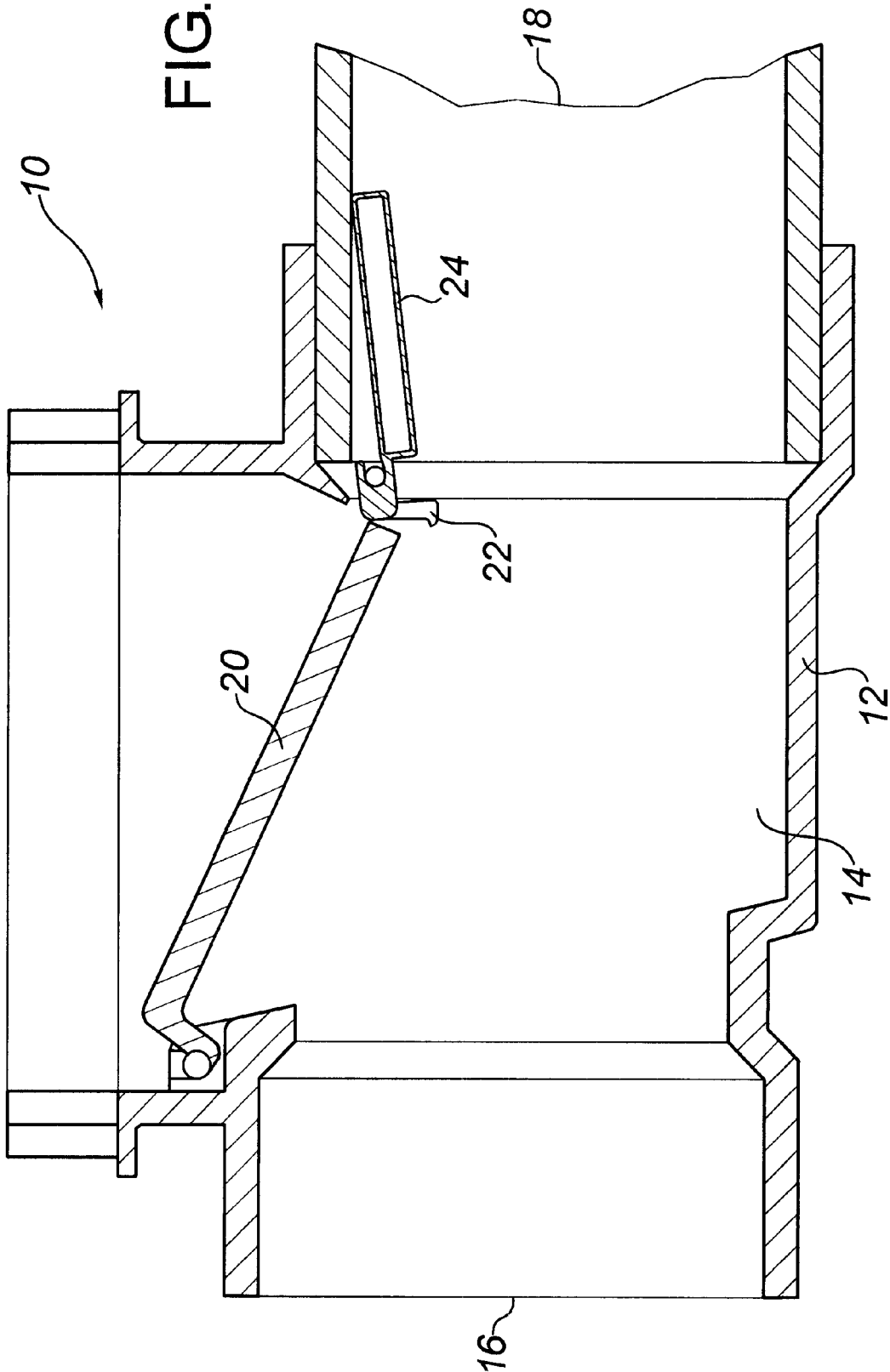
FIG. 2 is a side elevation view of the backwater valve illustrated in FIG. 1, with the locking member in the process of being carried by the float to the release position.
Figure 3:
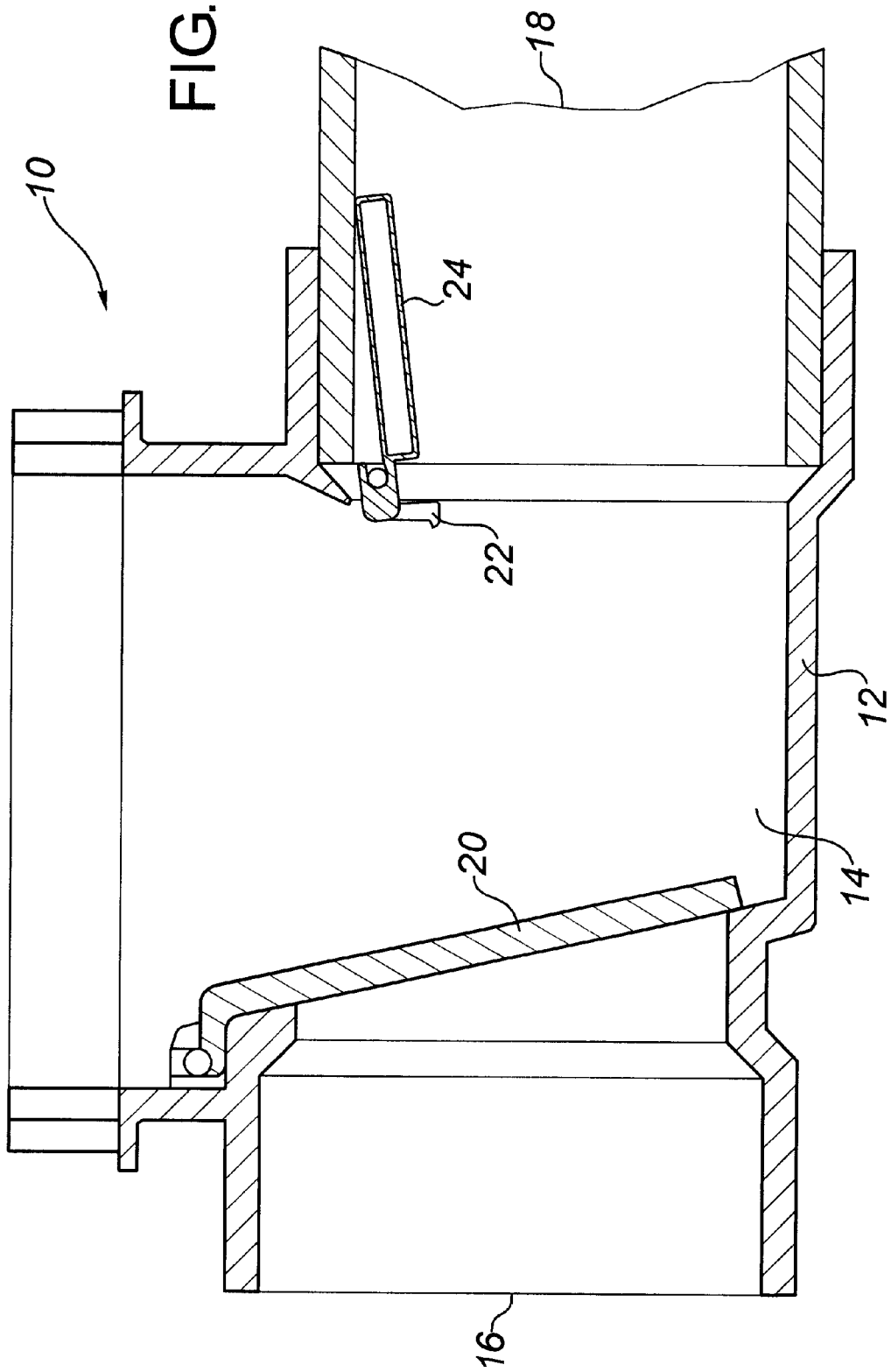
FIG. 3 is a side elevation view of the backwater valve illustrated in FIG. 1, with the closure gate in the closed position.
Figure 4:
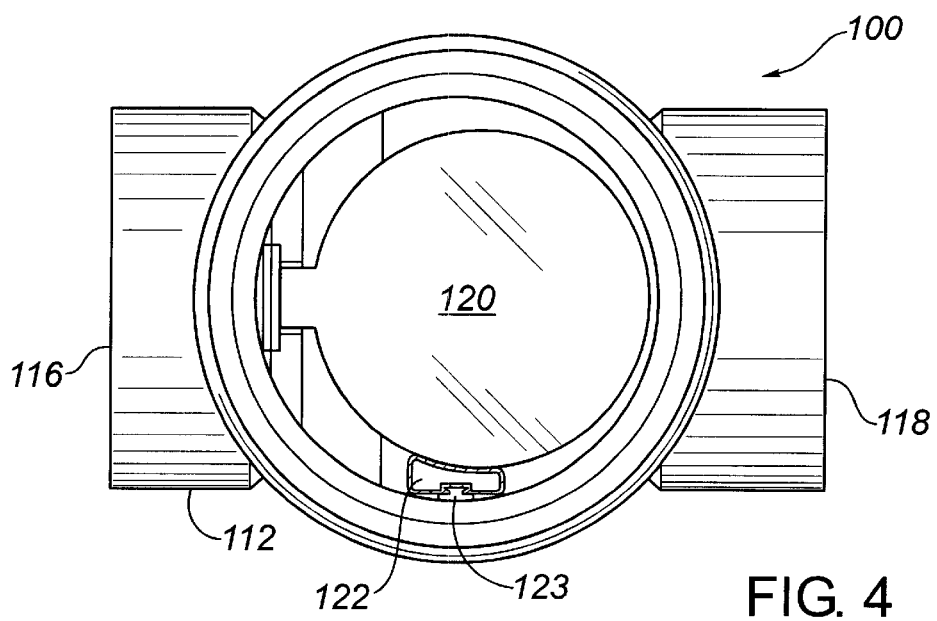
FIG. 4 is a top plan view, in section, of a second embodiment of a backwater valve constructed in accordance with the teachings of the present invention with the closure gate in the open position.

A first embodiment of a backwater valve, generally identified by reference numeral 10, will now be described with reference to FIGS. 1 through 3. A second embodiment of a backwater valve, generally identified by reference numeral 100, will now be described with reference to FIGS. 4 through 7.

Figure 1:
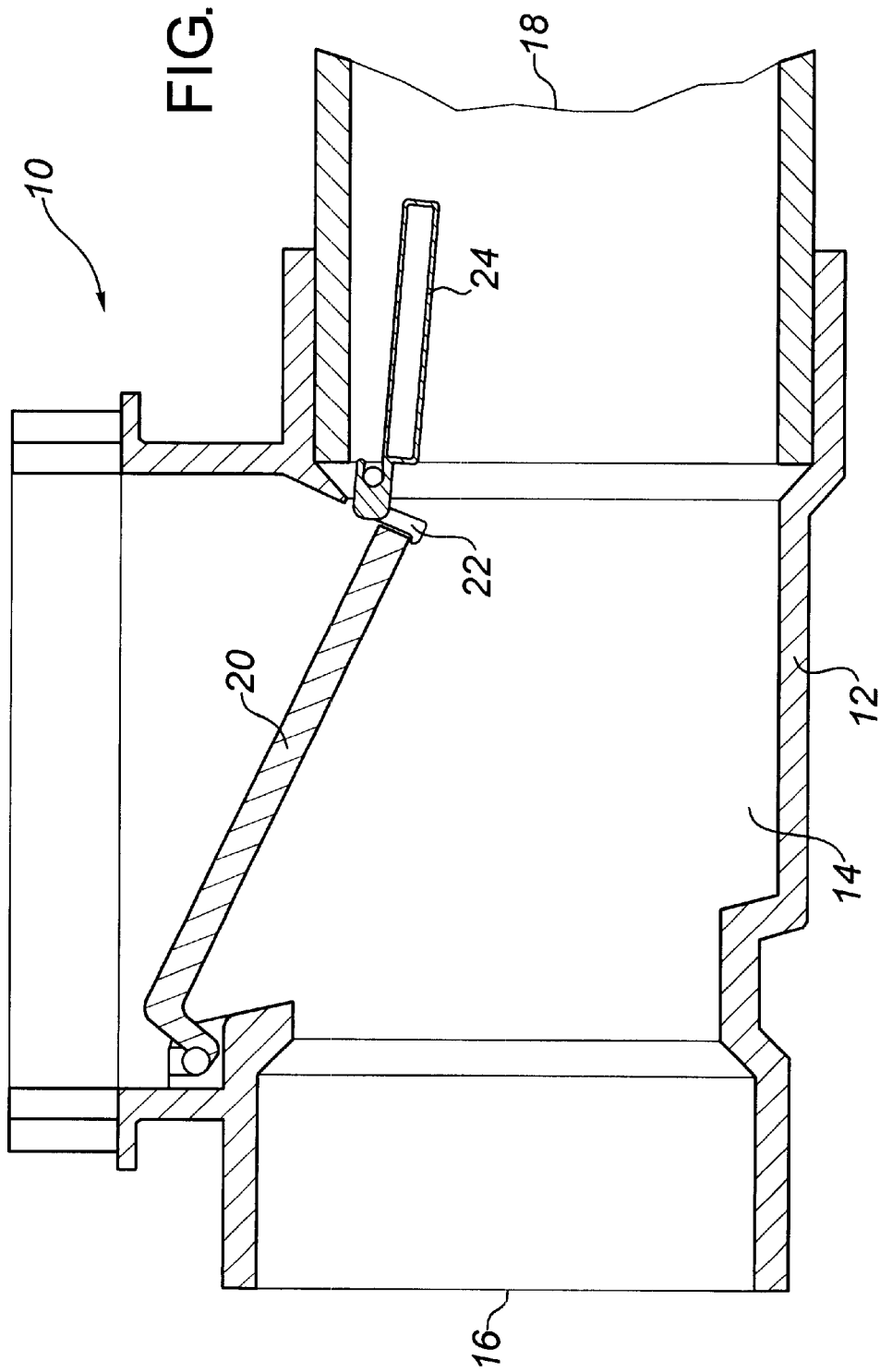
FIG. 1 is a side elevation view of a first embodiment of a backwater valve constructed in accordance with the teachings of the present invention with the closure gate in the open position.

Referring to FIG. 1, backwater valve 10 includes a body 12 having a flow passage 14 extending therethrough with an inlet side 16 and an outlet side 18. A closure gate 20 is pivotally mounted within body 12 above inlet side 16 of flow passage 14. Closure gate 20 has an open position above flow passage 14, which permits liquid to pass through flow passage 14. A locking member 22 is mounted on body 12. The locking member has a locking position as illustrated in FIG. 1 and a release position as illustrated in FIG. 2. Referring to FIG. 1, in the locking position, locking member 22 engages and holds closure gate 20 in the open position. A float 24 is secured to locking member 22. Float 24 rises and falls with liquid in the body. Referring to FIG. 2, float 24 carries locking member 22 to the release position as liquid rises in the body until locking member 22 disengages from closure gate 20, thereby releasing closure gate 20 to fall into the closed position. Referring to FIG. 3, when closure gate 20 falls into the closed position, closure gate 20 blocks inlet side 16 of flow passage 14. This prevents liquid from flowing back through inlet side 16 of flow passage 14.

Figure 5:
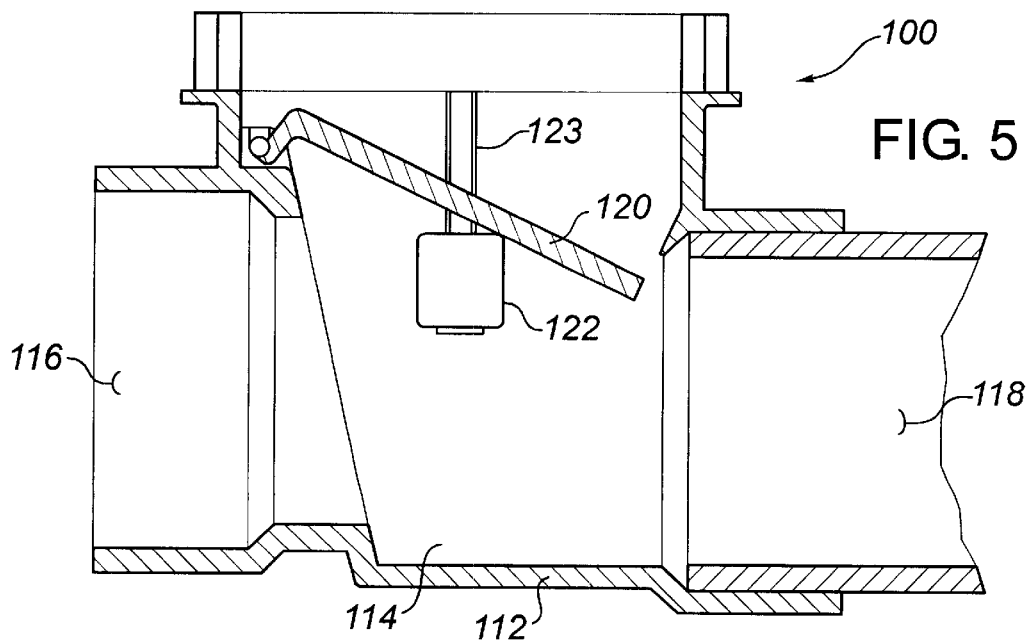
FIG. 5 is a side elevation view, in section, of the backwater valve illustrated in FIG. 4.
Figure 6:
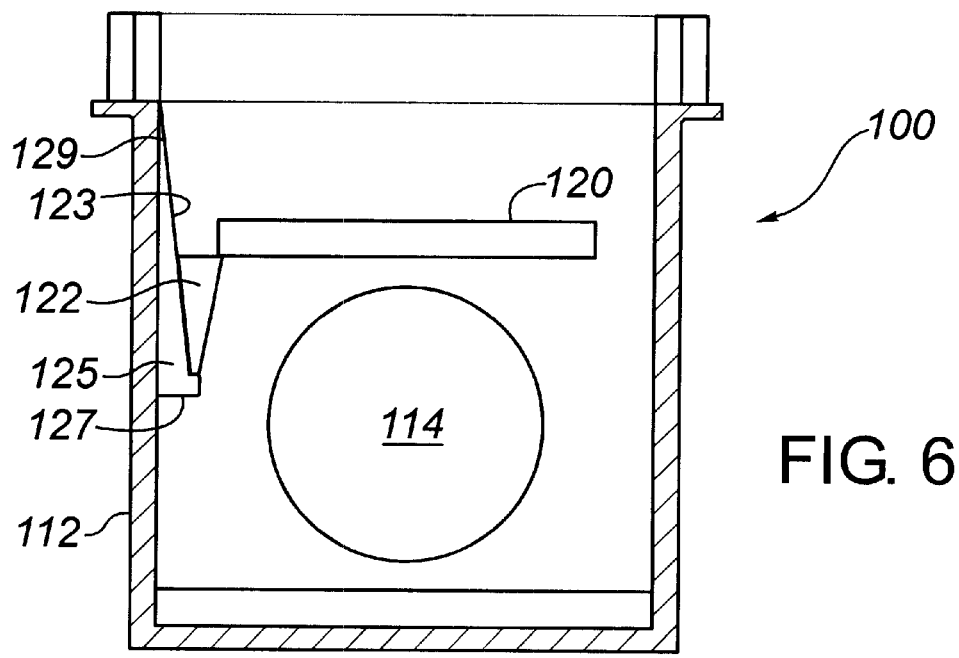
FIG. 6 is an end elevation view, in section, of the backwater valve illustrated in FIG. 4, with the locking member engaged to hold the closure gate in the open position.
Figure 7:
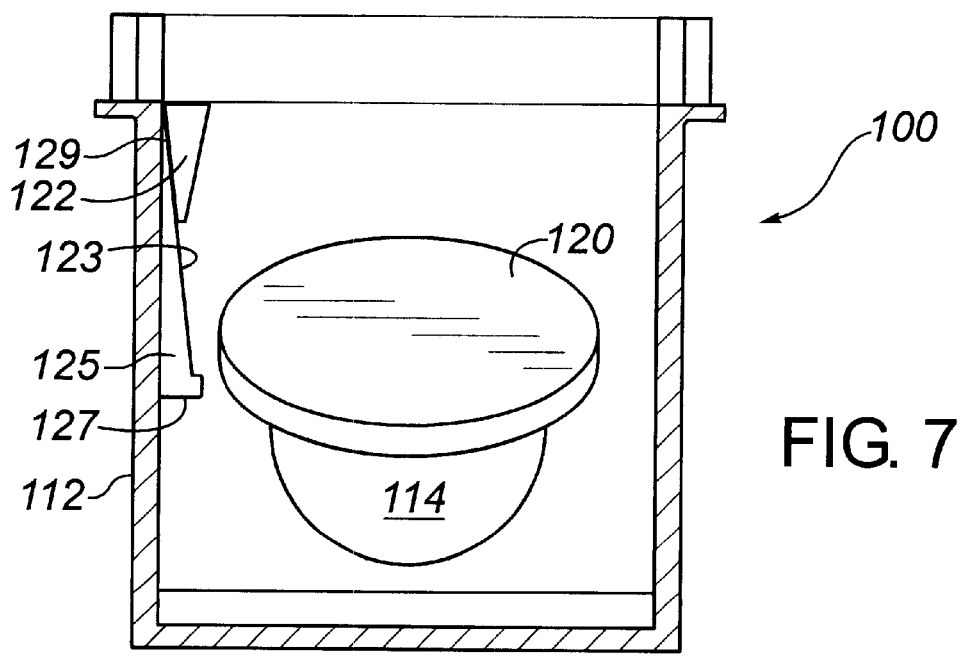
FIG. 7 is an end elevation view, in section, of the backwater valve illustrated in FIG. 4, the locking member having floated to a release position and the closure gate in the process of moving to the closed position.

In order that the full scope of the invention may be appreciated, second embodiment 100 has been provided. Second embodiment 100 illustrates how the teachings of the invention may be achieved with an alternative structure. Referring to FIG. 5, backwater valve 100 includes a body 112 having a flow passage 114 extending therethrough with an inlet side 116 and an outlet side 118. A closure gate 120 is pivotally mounted within body 112 above inlet side 116 of flow passage 114. Closure gate 120 has an open position above flow passage 114, which permits liquid to pass through flow passage 114. A locking member 122 travels along a guide track 123 which is mounted on body 112. Referring to FIGS. 6 and 7, a wedge shaped spacer 125 positions guide track 123 on an incline. Guide track 123 has a lower end 127 and an upper end 129. When locking member 122 is positioned at lower end 127 of guide track 123, locking member 122 is in a locking position as illustrated in FIG. 6. As locking member 122 follows guide track 123 toward upper end 129, guide track 123 diverges away from closure gate 120 until eventually a release position is reached as illustrated in FIG. 7. Referring to FIG. 6, in the locking position, locking member 122 engages and holds closure gate 120 in the open position. A float is either secured or incorporated into the fabrication of locking member 122. In the illustrated embodiment, locking member 122 is made from a material that will float. Locking member 122 rises and falls with liquid in body 112. Referring to FIG.

7, when the rising liquid in body 112 carries locking member 122 along guide track 123 toward upper end 129, eventually locking member 122 will move away sufficiently from closure gate 120, so as to allow it to fall by force of gravity into the closed position.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A backwater valve, comprising:
   a body having a substantially horizontal flow passage extending therethrough with an inlet side and an outlet side;
   a closure gate pivotally mounted within the body above the inlet side of the flow passage, the closure gate having an open position above the flow passage and a closed position blocking the inlet side of the flow passage to prevent a resersal of flow;
   a float activated locking member mounted on the body, the locking member having a locking position and a release position, in the locking position the locking member engaging and holding the closure gate in the open position, the float activated locking member being influenced by liquid rising in the body whereby the locking member is carried to the release position when the liquid rises above a preset level and upon release the closure gate closes by force of gravity to block the flow passage thereby preventing the reversal of flow.

2. The backwater valve as defined in claim 1, wherein the locking member is pivotally mounted with a catch on one side that engages the closure gate and a float on the other.

3. The backwater valve as defined in claim 1, wherein the locking member travels up an inclined guide track which diverges from the closure gate at the release position, the locking member being at a lower end of the guide track when in the locking position and at an upper end of the guide track when in the release position, as the locking member travels up the guide track the locking member moves away from the closure gate, a spacial separation occurs between the locking member and the closure gate at the release position and without support from the locking member the closure gate falls by force of gravity.

* * * * *

UNITED STATES PATENT AND TRADEMARK OFFICE
CERTIFICATE OF CORRECTION

PATENT NO. : 6,446,665 B2
DATED : September 10, 2002
INVENTOR(S) : Gabe Coscarella It is certified that error appears in the above-identified patent and that said Letters Patent is hereby corrected as shown below:

Column 3,
Line 20, "resersal" should read -- reversal --.

Signed and Sealed this

Eighteenth Day of October, 2005

JON W. DUDAS
*Director of the United States Patent and Trademark Office*